(12) United States Patent
O'Neil et al.

(10) Patent No.: US 8,897,752 B2
(45) Date of Patent: *Nov. 25, 2014

(54) PICO-CELL EXTENSION FOR CELLULAR NETWORK

(71) Applicant: AT&T Intellectual Property I, L.P., Atlanta, GA (US)

(72) Inventors: Douglas O'Neil, Yorba Linda, CA (US); Donna Sharer, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/671,191

(22) Filed: Nov. 7, 2012

(65) Prior Publication Data

US 2013/0065558 A1    Mar. 14, 2013

Related U.S. Application Data

(63) Continuation of application No. 11/457,129, filed on Jul. 12, 2006, now Pat. No. 8,326,296.

(51) Int. Cl.
*H04M 1/66* (2006.01)
*H04W 84/04* (2009.01)
*H04W 12/06* (2009.01)
*H04W 92/12* (2009.01)

(52) U.S. Cl.
CPC ............ *H04W 84/045* (2013.01); *H04W 12/06* (2013.01); *H04W 92/12* (2013.01)
USPC .......................... 455/411; 455/445; 455/456.1

(58) Field of Classification Search
CPC ........ H04W 12/00; H04W 4/16; H04W 64/00
USPC ....................................... 455/411, 445, 456.1
See application file for complete search history.

(56) References Cited

U.S. PATENT DOCUMENTS

| 5,745,559 A | 4/1998 | Weir |
| 5,864,764 A | 1/1999 | Thro et al. |
| 6,052,594 A | 4/2000 | Chuang et al. |

(Continued)

FOREIGN PATENT DOCUMENTS

| CN | 1429005 A | 12/2001 |
| CN | 101017554 A | 8/2007 |

(Continued)

OTHER PUBLICATIONS

International Search Report and Written Opinion dated Oct. 27, 2009 for PCT Application U.S. Appl. No. PCT/US2009/043861, 14 Pages.

(Continued)

*Primary Examiner* — Danh Le
(74) *Attorney, Agent, or Firm* — Amin, Turocy & Watson, LLP

(57) ABSTRACT

A pico-cell is located within a facility. The pico-cell has a wireless protocol for carrying calls placed to and from mobile devices in the facility. A call distributor is in communication with the pico-cell and handles calls carried by the pico-cell. The call distributor includes an embedded wireless switch for routing calls to and from mobile devices in the facility using the wireless protocol.

20 Claims, 8 Drawing Sheets

(56) References Cited

U.S. PATENT DOCUMENTS

| | | |
|---|---|---|
| 6,151,505 A | 11/2000 | Larkins |
| 6,208,659 B1 | 3/2001 | Govindarajan et al. |
| 6,219,786 B1 | 4/2001 | Cunningham et al. |
| 6,256,504 B1 | 7/2001 | Tell et al. |
| 6,266,537 B1 | 7/2001 | Kashitani et al. |
| 6,295,454 B1 | 9/2001 | Havinis et al. |
| 6,363,261 B1 | 3/2002 | Raghavan |
| 6,483,852 B1 | 11/2002 | Jacquet et al. |
| 6,484,096 B2 | 11/2002 | Wong |
| 6,512,478 B1 | 1/2003 | Chien |
| 6,710,651 B2 | 3/2004 | Forrester |
| 6,718,023 B1 | 4/2004 | Zolotov |
| 6,768,722 B1 * | 7/2004 | Katseff et al. ............... 370/260 |
| 7,080,139 B1 | 7/2006 | Briggs et al. |
| 7,142,861 B2 | 11/2006 | Murai |
| 7,146,153 B2 | 12/2006 | Russell |
| 7,209,739 B1 | 4/2007 | Narayanabhatla |
| 7,277,410 B2 | 10/2007 | Horneman |
| 7,317,931 B2 | 1/2008 | Guo |
| 7,370,356 B1 | 5/2008 | Guo |
| 7,437,755 B2 | 10/2008 | Farino et al. |
| 7,493,390 B2 | 2/2009 | Bobde et al. |
| 7,496,383 B2 | 2/2009 | Kurata |
| 7,509,124 B2 | 3/2009 | O'Neil |
| 7,516,219 B2 | 4/2009 | Moghaddam et al. |
| 7,558,251 B1 * | 7/2009 | Huang et al. ............... 370/352 |
| 7,574,731 B2 | 8/2009 | Fascenda et al. |
| 7,613,444 B2 | 11/2009 | Lindqvist et al. |
| 7,614,078 B1 | 11/2009 | Stieglitz et al. |
| 7,623,857 B1 | 11/2009 | O'Neil |
| 7,633,910 B2 | 12/2009 | Zhun et al. |
| 7,751,826 B2 | 7/2010 | Gardner |
| 7,761,526 B2 | 7/2010 | Pounds et al. |
| 7,768,983 B2 | 8/2010 | Nylander et al. |
| 7,853,265 B1 | 12/2010 | Ahmad et al. |
| 7,885,644 B2 | 2/2011 | Gallagher et al. |
| 7,929,537 B2 | 4/2011 | Vasudevan et al. |
| 7,929,970 B1 | 4/2011 | Gunasekara et al. |
| 7,941,144 B2 | 5/2011 | Nylander et al. |
| 7,995,994 B2 | 8/2011 | Khetawat et al. |
| 8,064,909 B2 | 11/2011 | Spinelli et al. |
| 8,103,285 B2 | 1/2012 | Kalhan et al. |
| 8,108,923 B1 | 1/2012 | Satish et al. |
| 8,265,685 B2 | 9/2012 | Vikberg et al. |
| 8,437,745 B2 | 5/2013 | Theppasandra et al. |
| 8,509,778 B2 | 8/2013 | Buchmayer et al. |
| 8,743,776 B2 | 6/2014 | Gurajala et al. |
| 2002/0044639 A1 | 4/2002 | Shioda et al. |
| 2002/0077115 A1 | 6/2002 | Ruutu et al. |
| 2002/0098837 A1 | 7/2002 | Ferrario et al. |
| 2002/0107018 A1 | 8/2002 | Nakamura et al. |
| 2002/0123365 A1 | 9/2002 | Thorson |
| 2002/0142791 A1 | 10/2002 | Chen et al. |
| 2003/0028621 A1 | 2/2003 | Furlong et al. |
| 2003/0109271 A1 | 6/2003 | Lewis et al. |
| 2003/0125044 A1 | 7/2003 | Deloach |
| 2003/0133558 A1 * | 7/2003 | Kung et al. ............... 379/215.01 |
| 2003/0139180 A1 | 7/2003 | McIntosh et al. |
| 2003/0142637 A1 | 7/2003 | Khawer et al. |
| 2003/0144793 A1 | 7/2003 | Melaku et al. |
| 2003/0153302 A1 | 8/2003 | Lewis et al. |
| 2004/0111382 A1 | 6/2004 | Haji-Ioannou |
| 2004/0125781 A1 | 7/2004 | Walter et al. |
| 2004/0203846 A1 | 10/2004 | Caronni et al. |
| 2004/0235455 A1 | 11/2004 | Jiang |
| 2004/0236702 A1 | 11/2004 | Fink et al. |
| 2004/0258003 A1 | 12/2004 | Kotot et al. |
| 2004/0264428 A1 | 12/2004 | Choi et al. |
| 2005/0003797 A1 | 1/2005 | Baldwin |
| 2005/0009499 A1 | 1/2005 | Koster |
| 2005/0024201 A1 | 2/2005 | Culpepper et al. |
| 2005/0026650 A1 | 2/2005 | Russell |
| 2005/0075114 A1 | 4/2005 | Dennison et al. |
| 2005/0108529 A1 | 5/2005 | Juneau |
| 2005/0144279 A1 | 6/2005 | Wexelblat |
| 2005/0160276 A1 | 7/2005 | Braun et al. |
| 2005/0172148 A1 | 8/2005 | Ying |
| 2005/0177645 A1 | 8/2005 | Dowling et al. |
| 2005/0223389 A1 | 10/2005 | Klein et al. |
| 2005/0239448 A1 | 10/2005 | Bayne |
| 2005/0250527 A1 | 11/2005 | Jugl |
| 2005/0254451 A1 | 11/2005 | Grosbach |
| 2005/0255893 A1 | 11/2005 | Jin et al. |
| 2005/0259654 A1 | 11/2005 | Faulk et al. |
| 2005/0269402 A1 | 12/2005 | Spitzer et al. |
| 2005/0283518 A1 | 12/2005 | Sargent |
| 2006/0031387 A1 | 2/2006 | Hamzeh et al. |
| 2006/0031493 A1 | 2/2006 | Cugi |
| 2006/0046647 A1 | 3/2006 | Parikh et al. |
| 2006/0074814 A1 | 4/2006 | Lovell et al. |
| 2006/0075098 A1 | 4/2006 | Becker et al. |
| 2006/0182074 A1 | 8/2006 | Kubler et al. |
| 2006/0223498 A1 | 10/2006 | Gallagher et al. |
| 2006/0244589 A1 * | 11/2006 | Schranz ............... 340/539.22 |
| 2006/0281457 A1 | 12/2006 | Huotari et al. |
| 2007/0002844 A1 | 1/2007 | Ali |
| 2007/0008894 A1 | 1/2007 | Lynch et al. |
| 2007/0025245 A1 | 2/2007 | Porras et al. |
| 2007/0032225 A1 | 2/2007 | Konicek et al. |
| 2007/0032269 A1 | 2/2007 | Shostak |
| 2007/0066318 A1 | 3/2007 | Danzeisen et al. |
| 2007/0074272 A1 | 3/2007 | Watanabe |
| 2007/0094601 A1 | 4/2007 | Greenberg et al. |
| 2007/0097093 A1 | 5/2007 | Oshita et al. |
| 2007/0097938 A1 | 5/2007 | Nylander et al. |
| 2007/0097939 A1 | 5/2007 | Nylander et al. |
| 2007/0097983 A1 | 5/2007 | Nylander et al. |
| 2007/0099561 A1 | 5/2007 | Voss |
| 2007/0104166 A1 | 5/2007 | Rahman et al. |
| 2007/0111706 A1 | 5/2007 | Kumar et al. |
| 2007/0123253 A1 | 5/2007 | Simongini et al. |
| 2007/0124802 A1 | 5/2007 | Anton et al. |
| 2007/0133563 A1 | 6/2007 | Hundscheidt et al. |
| 2007/0150732 A1 | 6/2007 | Suzuki et al. |
| 2007/0155421 A1 | 7/2007 | Alberth et al. |
| 2007/0167175 A1 * | 7/2007 | Wong et al. ............... 455/456.5 |
| 2007/0183427 A1 | 8/2007 | Nylander et al. |
| 2007/0184815 A1 | 8/2007 | Aebi |
| 2007/0199076 A1 | 8/2007 | Rensin et al. |
| 2007/0220252 A1 | 9/2007 | Sinko et al. |
| 2007/0232332 A1 | 10/2007 | Holur |
| 2007/0258418 A1 | 11/2007 | Wurtenberger et al. |
| 2007/0270152 A1 | 11/2007 | Nylander et al. |
| 2007/0275739 A1 | 11/2007 | Blackburn |
| 2007/0287501 A1 | 12/2007 | Hoshina |
| 2008/0043972 A1 | 2/2008 | Ruetschi et al. |
| 2008/0049702 A1 | 2/2008 | Meylan et al. |
| 2008/0065752 A1 | 3/2008 | Ch'ng et al. |
| 2008/0076392 A1 | 3/2008 | Khetawat et al. |
| 2008/0076393 A1 | 3/2008 | Khetawat et al. |
| 2008/0076398 A1 | 3/2008 | Mate et al. |
| 2008/0076412 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0081636 A1 | 4/2008 | Nylander et al. |
| 2008/0082538 A1 | 4/2008 | Meijer et al. |
| 2008/0119160 A1 | 5/2008 | Andriantsiferana et al. |
| 2008/0126531 A1 | 5/2008 | Setia et al. |
| 2008/0132239 A1 | 6/2008 | Khetawat et al. |
| 2008/0133742 A1 | 6/2008 | Southiere et al. |
| 2008/0141348 A1 | 6/2008 | Hovnanian et al. |
| 2008/0151807 A1 | 6/2008 | Meier et al. |
| 2008/0168099 A1 | 7/2008 | Skaf |
| 2008/0181184 A1 | 7/2008 | Kezys |
| 2008/0201076 A1 | 8/2008 | Huang et al. |
| 2008/0207170 A1 | 8/2008 | Khetawat et al. |
| 2008/0242280 A1 | 10/2008 | Shapiro et al. |
| 2008/0244148 A1 | 10/2008 | Nix et al. |
| 2008/0254792 A1 | 10/2008 | Ch'ng |
| 2008/0261602 A1 | 10/2008 | Livneh |
| 2008/0274753 A1 | 11/2008 | Attar et al. |
| 2008/0281687 A1 | 11/2008 | Hurwitz et al. |
| 2008/0282327 A1 | 11/2008 | Winget et al. |

(56) References Cited

U.S. PATENT DOCUMENTS

| | | |
|---|---|---|
| 2008/0299984 A1 | 12/2008 | Shimomura |
| 2008/0299992 A1 | 12/2008 | Eitan et al. |
| 2008/0305792 A1 | 12/2008 | Khetawat et al. |
| 2008/0305801 A1 | 12/2008 | Burgess et al. |
| 2008/0305834 A1 | 12/2008 | Janiszewski et al. |
| 2008/0318551 A1 | 12/2008 | Palamara et al. |
| 2009/0012898 A1 | 1/2009 | Sharma et al. |
| 2009/0031006 A1 | 1/2009 | Johnson et al. |
| 2009/0037973 A1 | 2/2009 | Gustave et al. |
| 2009/0042593 A1 | 2/2009 | Yavuz et al. |
| 2009/0046665 A1 | 2/2009 | Robson et al. |
| 2009/0047945 A1 | 2/2009 | Zhang |
| 2009/0059822 A1 | 3/2009 | Morrill et al. |
| 2009/0061821 A1 | 3/2009 | Chen et al. |
| 2009/0061873 A1 | 3/2009 | Bao et al. |
| 2009/0077620 A1 | 3/2009 | Ravi et al. |
| 2009/0082010 A1 | 3/2009 | Lee |
| 2009/0082020 A1 | 3/2009 | Ch'ng et al. |
| 2009/0092080 A1 | 4/2009 | Balasubramanian et al. |
| 2009/0092081 A1 | 4/2009 | Balasubramanian et al. |
| 2009/0092096 A1 | 4/2009 | Czaja |
| 2009/0092097 A1 | 4/2009 | Nylander et al. |
| 2009/0093232 A1 | 4/2009 | Gupta et al. |
| 2009/0094351 A1 | 4/2009 | Gupta et al. |
| 2009/0094680 A1 | 4/2009 | Gupta et al. |
| 2009/0097436 A1 | 4/2009 | Vasudevan et al. |
| 2009/0098871 A1 | 4/2009 | Gogic |
| 2009/0111499 A1 | 4/2009 | Bosch |
| 2009/0122773 A1 | 5/2009 | Gogic |
| 2009/0124262 A1 | 5/2009 | Vela et al. |
| 2009/0129336 A1 | 5/2009 | Osborn et al. |
| 2009/0129350 A1 | 5/2009 | Khandekar et al. |
| 2009/0131050 A1 | 5/2009 | Osborn |
| 2009/0131098 A1 | 5/2009 | Khandekar et al. |
| 2009/0135749 A1 | 5/2009 | Yang |
| 2009/0135794 A1 | 5/2009 | Su et al. |
| 2009/0156213 A1 | 6/2009 | Spinelli et al. |
| 2009/0161682 A1 | 6/2009 | Johnson et al. |
| 2009/0163216 A1 | 6/2009 | Hoang et al. |
| 2009/0163224 A1 | 6/2009 | Dean |
| 2009/0164547 A1 | 6/2009 | Ch'ng et al. |
| 2009/0170440 A1 | 7/2009 | Eyuboglu et al. |
| 2009/0170528 A1 | 7/2009 | Bull et al. |
| 2009/0180428 A1 | 7/2009 | Viswanath |
| 2009/0191844 A1 | 7/2009 | Morgan et al. |
| 2009/0191845 A1 | 7/2009 | Morgan et al. |
| 2009/0210324 A1 | 8/2009 | Bhogal |
| 2009/0213825 A1 | 8/2009 | Gupta et al. |
| 2009/0215429 A1 | 8/2009 | Caldwell et al. |
| 2009/0215452 A1 | 8/2009 | Balasubramanian et al. |
| 2009/0221303 A1 | 9/2009 | Soliman |
| 2009/0233574 A1 | 9/2009 | Shinozaki |
| 2009/0245176 A1 | 10/2009 | Balasubramanian et al. |
| 2009/0247157 A1 | 10/2009 | Yoon et al. |
| 2009/0253421 A1 | 10/2009 | Camp et al. |
| 2009/0253432 A1 | 10/2009 | Willey et al. |
| 2009/0257434 A1 | 10/2009 | Song et al. |
| 2009/0279701 A1 | 11/2009 | Moisand et al. |
| 2009/0291667 A1 | 11/2009 | Vakil et al. |
| 2009/0325634 A1 | 12/2009 | Bienas et al. |
| 2010/0022266 A1 | 1/2010 | Villier |
| 2010/0040026 A1 | 2/2010 | Melkesetian |
| 2010/0048165 A1 | 2/2010 | Caldwell et al. |
| 2010/0113067 A1 | 5/2010 | Fullam et al. |
| 2010/0167777 A1 | 7/2010 | Raghothaman et al. |
| 2010/0260068 A1 | 10/2010 | Bhatt et al. |
| 2011/0177794 A1 | 7/2011 | Nylander et al. |
| 2011/0200022 A1 | 8/2011 | Annamalai |
| 2011/0280154 A1 | 11/2011 | Silverstrim et al. |
| 2012/0258711 A1 | 10/2012 | Bao et al. |
| 2013/0165079 A1 | 6/2013 | Gogic |

FOREIGN PATENT DOCUMENTS

| | | |
|---|---|---|
| CN | 101175333 A | 5/2008 |
| GB | 2425291 A | 10/2006 |
| GB | 2425921 A | 11/2006 |
| JP | 20010264096 | 9/2001 |
| JP | 2003022303 | 1/2003 |
| JP | 2003288521 | 10/2003 |
| JP | 2004112324 | 4/2004 |
| JP | 2005073147 | 3/2005 |
| JP | 2005215849 | 8/2005 |
| JP | 2006067143 | 3/2006 |
| JP | 2008048055 | 2/2008 |
| WO | 0214987 | 2/2002 |
| WO | 2005076964 A2 | 8/2005 |
| WO | 2007015067 A2 | 2/2007 |
| WO | 2007040449 A1 | 4/2007 |
| WO | 2008047039 | 4/2008 |

OTHER PUBLICATIONS

International Search Report and Written Opinion mailed Feb. 23, 2010, for PCT Application No. PCT/US2009/043846, 13 pages.
OA dated Dec. 31, 2009 for U.S. Appl. No. 11/457,129, 16 pages.
OA dated Apr. 17, 2009 for U.S. Appl. No. 11/276,269, 15 pages.
OA dated Nov. 4, 2008 for U.S. Appl. No. 11/276,269, 15 pages.
OA dated Jun. 17, 2010 for U.S. Appl. No. 11/457,129, 15 pages.
Kaul, "Verizon's $250 femto box—A deliberate ploy behind the aggressive pricing?" Posted Tue, Jan. 20, 2009 13:19:46 EST; http://www.abiresearch.com/research_blog/569; © 2009 Allied Business Intelligence, Inc.
OA dated Mar. 29, 2011 for U.S. Appl. No. 12/276,002, 37 pages.
OA dated Apr. 13, 2011 for U.S. Appl. No. 12/276,058, 40 pages.
OA dated Apr. 19, 2011 for U.S. Appl. No. 12/276,238, 22 pages.
OA dated May 5, 2011 for U.S. Appl. No. 12/275,015, 32 pages.
OA dated Jun. 14, 2011 for U.S. Appl. No. 12/275,878, 35 pages.
OA dated Jun. 22, 2011 for U.S. Appl. No. 12/484,072, 38 pages.
OA dated Jul. 7, 2011 for U.S. Appl. No. 12/276,257, 24 pages.
OA dated Jun. 28, 2011 for U.S. Appl. No. 12/275,925, 18 pages.
OA dated Jun. 8, 2011 for U.S. Appl. No. 12/484,026, 30 pages.
OA dated Aug. 18, 2011 for U.S. Appl. No. 12/275,416, 39 pages.
OA dated Sep. 14, 2011 for U.S. Appl. No. 12/276,002, 35 pages.
OA dated Oct. 5, 2011 for U.S. Appl. No. 12/276,058, 37 pages.
OA dated Oct. 6, 2011 for U.S. Appl. No. 12/465,483, 50 pages.
OA dated Oct. 4, 2011 for U.S. Appl. No. 12/484,135, 44 pages.
OA dated Jul. 21, 2011 for U.S. Appl. No. 12/175,293, 30 pages.
OA dated Oct. 24, 2011 for U.S. Appl. No. 12/275,925, 14 pages.
OA dated Nov. 30, 2011 for U.S. Appl. No. 12/275,878, 38 pages.
OA dated Dec. 1, 2011 for U.S. Appl. No. 12/275,996, 44 pages.
OA dated Oct. 25, 2011 for U.S. Appl. No. 12/465,580, 39 pages.
OA dated Nov. 8, 2011 for U.S. Appl. No. 12/465,468, 50 pages.
OA dated Jan. 5, 2012 for U.S. Appl. No. 12/465,585, 43 pages.
OA dated Dec. 28, 2011 for U.S. Appl. No. 12/175,293, 38 pages.
OA dated Nov. 21, 2011 for U.S. Appl. No. 12/484,026, 37 pages.
OA dated Dec. 14, 2011 for U.S. Appl. No. 12/484,072, 44 pages.
OA dated Nov. 1, 2011 for U.S. Appl. No. 12/816,087, 33 pages.
OA dated Mar. 5, 2012 for U.S. Appl. No. 12/465,598, 55 pages.
OA dated May 8, 2012 for U.S. Appl. No. 11/457,129, 38 pages.
OA dated Mar. 19, 2012 for U.S. Appl. No. 12/276,120, 68 pages.
OA dated Mar. 30, 2012 for U.S. Appl. No. 12/484,026, 30 pages.
Notice of Allowance dated Apr. 3, 2012 for U.S. Appl. No. 12/275,996, 38 pages.
OA dated Apr. 10, 2012 for U.S. Appl. No. 12/275,416, 32 pages.
OA dated Apr. 10, 2012 for U.S. Appl. No. 12/484,135, 45 pages.
Notice of Allowance dated Apr. 25, 2012 for U.S. Appl. No. 12/465,468, 35 pages.
OA dated Jul. 16, 2012 for U.S. Appl. No. 12/275,878, 37 pages.
OA dated Jul. 10, 2012 for U.S. Appl. No. 12/465,585, 32 pages.
OA dated Apr. 13, 2012 for U.S. Appl. No. 13/316,106, 35 pages.
OA dated Sep. 5, 2012 for U.S. Appl. No. 12/276,120, 49 pages.
OA dated Aug. 16, 2012 for U.S. Appl. No. 12/465,598, 31 pages.
OA dated Sep. 6, 2012 for U.S. Appl. No. 12/579,957, 51 pages.
OA dated Sep. 10, 2012 for U.S. Appl. No. 12/276,002, 54 pages.
OA dated Oct. 2, 2012 for U.S. Appl. No. 12/484,026, 29 pages.

(56) References Cited

OTHER PUBLICATIONS

OA dated Oct. 11, 2012 for U.S. Appl. No. 13/487,794, 45 pages.
Office Action dated Dec. 3, 2012 for U.S. Appl. No. 12/275,416, 33 pages.
Japanese Office Action mailed Sep. 13, 2012 for Japanese Patent Application 2011-509675, 4 pages.
OA dated Oct. 9, 2012 for U.S. Appl. No. 13/298,924, 51 pages.
OA dated Nov. 1, 2012 for U.S. Appl. No. 12/276,058, 59 pages.
OA dated Nov. 5, 2012 for U.S. Appl. No. 12/484,072, 52 pages.
OA dated Nov. 20, 2012 for U.S. Appl. No. 12/275,878, 28 pages.
Japanese Office Action mailed Sep. 13, 2012 for Japanese Patent Application No. 2011-509669.
Canadian Office Action mailed Oct. 30, 2012 for Canadian Patent Application No. 2,722,324, 3 pages.
Office Action dated Jan. 17, 2013 for U.S. Appl. No. 13/554,710, 42 pages.
OA dated Feb. 26, 2013 for U.S. Appl. No. 12/276,120, 59 pages.
Chinese Office Action for Chinese Application No. 200980117263.8 dated Feb. 16, 2013, 7 pages.
Chinese Office Action for Chinese Application No. 200980117188.5 dated Jan. 31, 2013, 11 pages.
Final OA dated Mar. 14, 2013 for U.S. Appl. No. 12/484,072, 34 pages.
Final OA dated Feb. 15, 2013 for U.S. Appl. No. 12/579,957, 17 pages.
Office Action dated Apr. 23, 2013 for U.S. Appl. No. 12/175,293, 41 pages.
Canadian Office Action mailed Mar. 26, 2013 for Canadian Patent Application No. 2,722,324, 4 pages.
Office Action dated Jul. 15, 2013 for U.S. Appl. No. 13/554,710, 37 pages.
Office Action dated Aug. 13, 2013 for U.S. Appl. No. 12/276,120, 66 pages.
Office Action dated Aug. 12, 2013 for U.S. Appl. No. 12/275,416, 36 pages.
Office Action dated Sep. 9, 2013 for U.S. Appl. No. 12/465,585, 45 pages.
Office Action dated Oct. 2, 2013 for U.S. Appl. No. 12/275,878, 38 pages.
Office Action dated Oct. 3, 2013 for U.S. Appl. No. 13/892,923, 62 pages.
Office Action dated Oct. 22, 2013 for U.S. Appl. No. 13/898,910, 50 pages.
Office Action dated Oct. 3, 2013 for U.S. Appl. No. 13/934,644, 17 pages.
Chinese Office Action dated Oct. 24, 2013 for Chinese Patent Application No. 200980117263.8, 13 pages.
Chinese Office Action dated Oct. 21, 2013 for Chinese Patent Application No. 200980117188.5, 11 pages.
Japanese Office Action dated Oct. 3, 2013 for Japanese Patent Application No. 2011-509669, 15 pages.
Office Action dated Dec. 12, 2013 for U.S. Appl. No. 12/276,120, 78 pages.
Notice of Allowance dated Feb. 13, 2014 for U.S. Appl. No. 12/275,878, 34 pages.
Hasan, Mohammad Masud; Huang, Xiadong; Jue, Jason P.; "Survivable Wireless Access Network Design with Dual-homing Capabilities"; IEEE Global Telecommunications Conference, Nov. 27-Dec. 1, 2006, 5 pgs.
Japanese Office Action dated Jan. 16, 2014 for Japanese Patent Application No. 2013-026198, 8 pages.
Chinese Office Action dated Jun. 19, 2014 for Chinese Patent Application No. 200980117188.5, 5 Pages.
Office Action dated Mar. 26, 2014 for U.S. Appl. No. 12/465,585, 44 pages.
Office Action dated Jun. 9, 2014 for U.S. Appl. No. 12/276,120, 92 pages.
Notice of Allowance dated Apr. 4, 2014 for U.S. Appl. No. 14/090,802, 63 pages.
Office Action dated Mar. 24, 2014 for U.S. Appl. No. 13/934,644, 50 pages.
Office Action dated Jun. 11, 2014 for U.S. Appl. No. 13/675,150, 68 Pages.
Office Action dated Jun. 10, 2014 for U.S. Appl. No. 14/253,553, 16 pages.
Canadian Office Action dated May 13, 2014 for Canadian Patent Application 2,722,367, 5 Pages.

* cited by examiner ially, the user may experience a degradation of service or may be precluded entirely from sending or receiving information while inside a building or other structure.

PICO-CELL EXTENSION FOR CELLULAR NETWORK

CROSS-REFERENCE TO RELATED APPLICATIONS

This patent application is a continuation of U.S. patent application Ser. No. 11/457,129, filed on Jul. 12, 2006, entitled "PICO-CELL EXTENSION FOR CELLULAR NETWORK." The entirety of this patent application is incorporated herein by reference

BACKGROUND

Enterprises want wireless communications for their employees within their work place (office buildings and warehouses, retail facilities, etc) and in the field. Cell phones are satisfactorily used by employees for wide area mobile communications, but coverage within buildings is not always adequate. Coverage problems arise when a user attempts to use a cell phone inside a building. For example, electromagnetic signals, such as radio frequencies used by cellular phones, are unable to fully propagate through walls, metalized glass and other common building materials that separate the inside of a building from an outside environment. As a result, the user may experience a degradation of service or may be precluded entirely from sending or receiving information while inside a building or other structure.

One solution to poor in-building cellular coverage has been to install a wireless private branch exchange (PBX) and to issue employees wireless WiFi enabled session initiated protocol (SIP) phones for mobile communications within buildings. However, this requires the enterprise to purchase two mobile devices for each employee—a cell phone for wide area communication, and a WiFi SIP phone for communication within the work place—which may be a substantial expense. In addition, this requires employees to carry multiple mobile devices, each typically having different contact number associated with it. Thus, callers must dial a different number to reach the employee, depending on the location of the employee (e.g., in the work place or in the field).

BRIEF DESCRIPTION OF THE DRAWINGS

The detailed description is set forth with reference to the accompanying figures. In, the figures, the left-most digit(s) of a reference number identifies the figure in which the reference number first appears. The use of the same reference numbers in different figures indicates similar or identical items.

DETAILED DESCRIPTION

In one implementation, a pico-cell is located within a facility. The pico-cell has a wireless protocol for carrying calls placed to and from mobile devices in the facility. A call distributor is in communication with the pico-cell and handles calls carried by the pico-cell. The call distributor includes an embedded wireless switch for routing calls to and from mobile devices in the facility using the wireless protocol.

In another implementation, a wireless pico-cell receives a request from a mobile device using a wireless protocol to access a wireless pico-cell extension. The request from the mobile device is transmitted to a call distributor of the pico-cell extension. The mobile device is registered with a registered visitor database of the call distributor of the pico-cell extension, and the pico-cell extension authenticates the mobile device to send and receive communications via the pico-cell extension.

Overview

Figure 1:
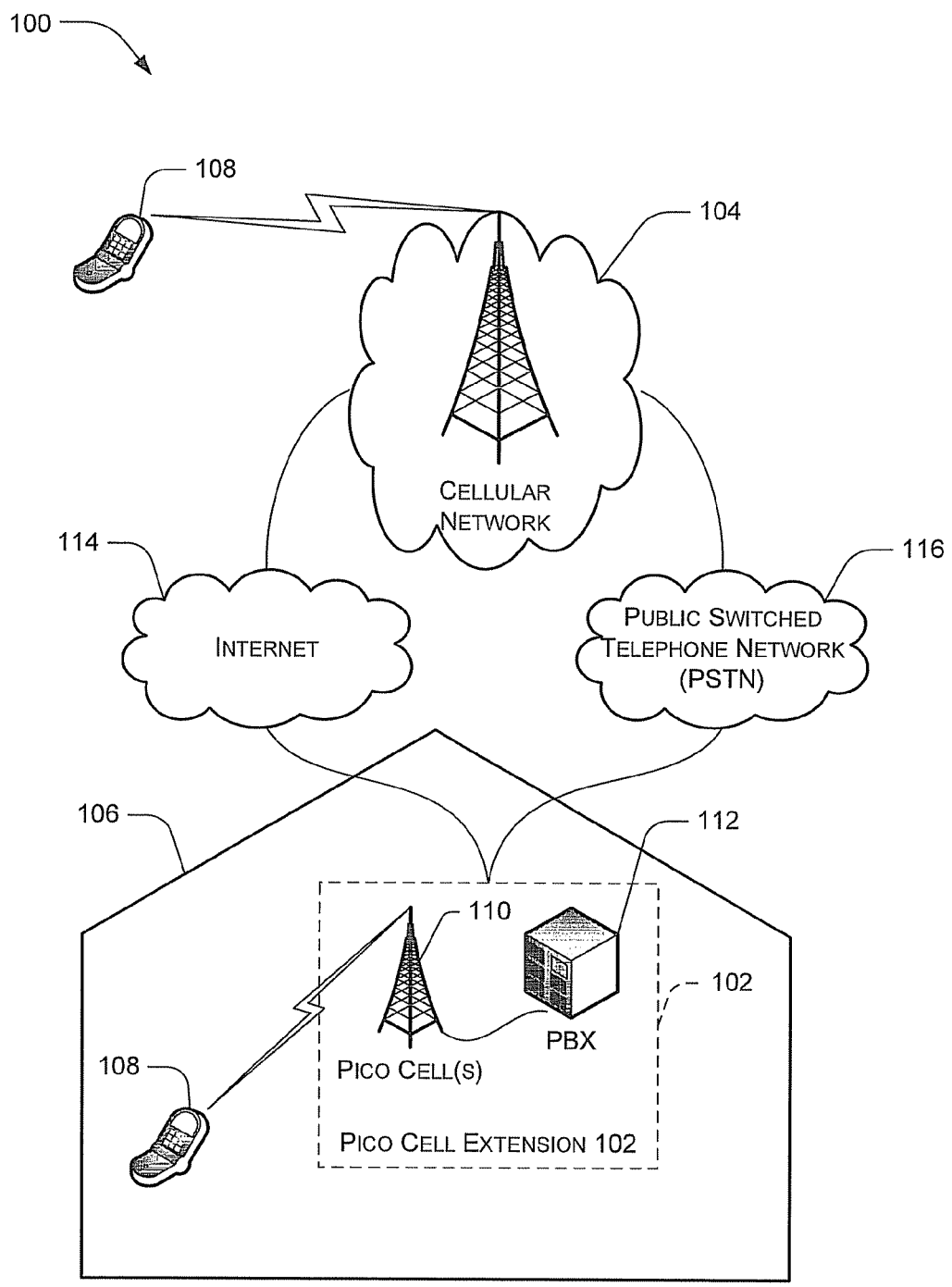
FIG. 1 is a schematic diagram showing an exemplary environment, in which a pico-cell extension is coupled to a wireless network to extend wireless coverage within a building.

FIG. 1 shows an exemplary environment 100, in which a pico-cell extension 102 is coupled to a wireless network, e.g., a cellular network 104 to extend and facilitate cellular coverage within a building 106, factory, warehouse, or other facility of an enterprise. Although a cellular network 104 and a cellular pico-cell extension 200 are shown and described in the following for ease of explanation, it should be appreciated that the invention is applicable to any type of wireless network and wireless pico-cell extension.

As shown in FIG. 1, in the field, a mobile device 108 is in wireless communication with the cellular network 104 via one or more cell towers in a known manner. The cellular network 104 may be based on the global system for mobile communications (GSM), code division multiple access (CDMA), and/or any other cellular protocol. Within the building 106, however, communication directly between the mobile device 108 and the cellular network may be limited or nonexistent. The pico-cell extension 102 uses cellular protocol and provides reception for the mobile device 108 within the building 106. In this way, employees of the enterprise or other users of the mobile devices 108 can use the same mobile device 108 in the field via the cellular network 104, and inside the enterprise facilities via the pico-cells extension(s) 102. Thus, the pico-cell extension 102 acts like an extension of the cellular network 104 within a structure, and provides or enhances cellular coverage within the structure.

Generally, the pico-cell extension 102 comprises one or more pico-cells 110 in communication with a call distributor, such as a private branch exchange (PBX) 112, and is connected to the cellular network 104 via the Internet 114 and/or the public switched telephone network (PSTN) 116. Additionally, the pico-cell extension 102 may include various other network components such as servers, local area network (LAN) switches, routers, memory, and processors, as described in more detail with respect to FIGS. 2-6 below. Pico-cells 110 approximate traditional cellular base stations, but are typically smaller and less powerful than a traditional cellular base station for serving smaller areas, such as buildings or portions thereof. The size and power of pico-cells 110 may vary depending on the desired coverage area and other needs of the enterprise. Examples of pico-cells usable with the pico-cell extensions include those described in copending U.S. patent application Ser. No. 11/276,269, filed Feb. 21, 2006, entitled "Intelligent Pico-Cell for Transport of Mobile device Communications Over Wireless Networks," which is incorporated herein by reference.

While the pico-cell extension 102 is shown comprising a single pico-cell 110 located within a single building 106, pico-cell extensions may in some implementations include plural pico-cells located in different rooms of a building, different locations within a room, and/or different buildings. Also, while a single PBX is shown, additional PBXs could be networked together to any number of one or more pico-cells, depending on the needs and resources of the enterprise.

In the exemplary implementations described herein, mobile devices 108 comprise cell phones and the pico-cells 110 comprise cellular pico-cells using the GSM protocol. However, mobile devices 108 could alternately comprise a variety of other types of computer and computer-like devices, such as, for example, Smartphones, tablet PCs, personal digital assistants (PDAs), workstations, or the like, which can transmit and/or receive voice, data, or a combination of voice and data. The pico-cells 110 may comprise pico-cells employing any cellular protocol capable of operating in conjunction with the mobile devices 108. Since the pico-cell extension 102 employs a cellular protocol, no inclusion of a bulky and/or costly client device in the mobile devices 108 is necessary to enable the mobile devices 108 to communicate with the pico-cell extension 102.

First Exemplary Pico-Cell Extension

Figure 2:
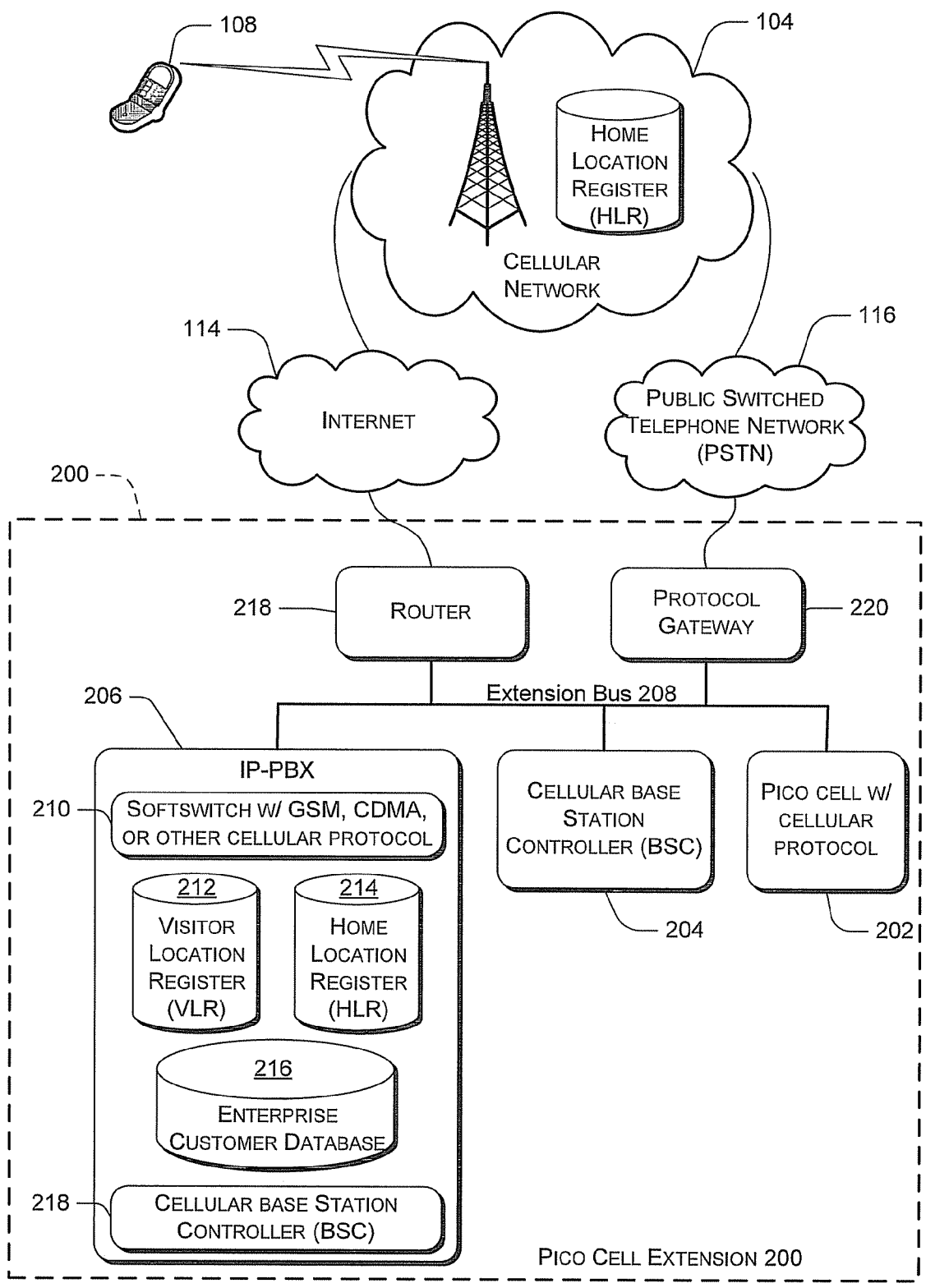
FIG. 2 is a block diagram showing details of an exemplary implementation of a pico-cell extension for a wireless network.

FIG. 2 is a block diagram showing details of an exemplary implementation of a pico-cell extension 200 that might be used to improve wireless coverage in, for example, a facility of an enterprise. The pico-cell extension 200 includes one or more pico-cells 202, a base station controller (BSC) 204, and a PBX 206 coupled together by a local area network (LAN) or extension bus 208. The pico-cells 202 operate at cellular frequencies (these may vary from country-to-country) and include cellular protocols, such as GSM, CDMA, and the like. The pico-cell extension 200 acts as a small extension of the cellular network 104 within the enterprise facility, and carries calls placed to and from mobile devices 108 in the facility in much the same way as a conventional macro cellular base station of the cellular network 104. That is, the pico-cell extension 200 handles calls among mobile devices 108 in the facility, and between mobile devices 108 in the facility and mobile devices and/or wireline phones outside the facility.

The pico-cells 202 are connected to the other components on the extension bus 208 through an Internet protocol security (IPSEC) tunnel. The pico-cells 202 and other components of the pico-cell extension 200 may be connected to the extension bus 208 via an Ethernet port or any other conventional network connection, such as via a broadband modem, or the like.

The BSC 204 acts as a concentrator into which the pico-cells 202 attached to the pico-cell extension 200 are aggregated. The BSC 204 handles allocation of radio channels, receives measurements from the mobile phones, and/or controls handovers among the pico-cells 202 and between the pico-cells 202 and the cellular network 104. The BSC 204 may also include a database containing information about the pico-cells 202 that it controls, such as carrier frequencies, frequency hopping lists, power reduction levels, receiving levels for pico-cell border calculations, and the like.

In this implementation, the PBX 206 comprises an Internet protocol PBX (IP-PBX), which uses the Internet protocol to carry voice calls. The IP-PBX 206 includes an embedded softswitch 210 with cellular protocols corresponding to those of the connected pico-cells 202 (such as GSM, CDMA, and the like). A softswitch is a software program, which manages and connects calls from one phone to another. Generally, softswitches may provide features including call processing, measuring and monitoring capabilities, call detail reports for the IP endpoints, signaling notifications, flexible call routing and redirection, and the like.

The softswitch 210 in the IP-PBX 206 manages and connects calls to and from phones within the enterprise, including mobile devices 108. Also, the softswitch 210 may include the full GSM, CDMA, or other cellular feature set provided by the cellular carrier. Because the softswitch 210 is embedded in the IP-PBX 206, mobile devices 108 registered with the IP-PBX 206 retain their full functionality and host of features offered by or purchased from the cellular carrier on the cellular network 104. Thus, users can use all the functions of their cell phones or other mobile devices within the enterprise. This full functionality is provided without the need for a dual-mode handset or for enterprise employees to carry multiple devices. The IP-PBX 206 with the embedded soft switch 210 acts as a small standalone cellular switch, with functionality comparable to a standard cellular switch of a cellular network. The enhanced cellular coverage within the enterprise provided by the IP-PBX 206 with the embedded soft switch 210 may allow enterprises to eliminate the use of traditional wire line desk phones, which have limited functionality, and to replace them with readily available, feature-rich cell phones or other mobile devices 108.

The IP-PBX 206 also comprises a registered visitor database such as a visitor location register (VLR) 212, a registered home user database such as a home location register (HLR) 214, and an enterprise customer database 216. The VLR 212 maintains a list of all mobile devices 108 currently in the coverage area of the IP-PBX 206, regardless of whether the mobile devices are authorized to access the enterprise pico-cell extension 200. The HLR 214 maintains a list of subscriber profiles of enterprise wireless users and/or mobile devices 108 that are authorized to access the pico-cell extension 200. The HLR 214 may also maintain a rule set for determining how and whether to handle calls placed by visitors to the enterprise (i.e., mobile devices not registered with the enterprise IP-PBX 206). The rule set may, for example, specify whether to carry calls placed by visitors on the pico-cell extension 200, and if so, whether the visitor will be charged for using the pico-cell extension 200. The enterprise customer database 216 is a readily modifiable database of customer profiles administered by the enterprise, which is used to periodically populate information into the HLR 214. The customer database 216 may, for example, define a list of customers (e.g., employees, clients, etc.) and/or mobile devices that are authorized to access the enterprise pico-cell extension 200, define the features available to end users of the pico-cell extension 200, rule sets about what information end users can change about their profiles (e.g., PBX features, cellular features, etc.). Typically, the customer database 216 is updated by information technology (IT) staff of the enterprise, or directly by the end mobile users. The customer database 216 may be accessed and updated using any suitable interface, such as a web interface, a direct interface on the mobile device, or the like.

In practice, a cellular carrier still maintains a profile for each subscriber or mobile device 108 in a HLR of the cellular network 104. When a mobile device 108 enters the enterprise and attempts to access one of the enterprise pied-cells 202, the VLR 212 registers the mobile device 108 with its IP-PBX 206 as a "roamer." The pico-cell extension 200 (specifically, the BSC 204 or IP-PBX 206) queries the HLR 214 to confirm that the mobile device 108 is authorized to access the pico-cell extension 200 and, if so, the level of services available to the mobile device 108. The pico-cell extension 200 also conveys to the HLR of the cellular carrier the current location of the mobile device and that the mobile device 108 has entered the coverage area of the specific pico-cell 202. While the VLR 212, HLR 214, and enterprise customer database 216 are shown and described as being part of the IP-PBX 206, they could instead be implemented as databases stored elsewhere in the pico-cell extension 200 and in communication with the IP-PBX 204 via the extension bus 208.

In addition to, or instead of, the BSC 204 on the extension bus 208, the IP-PBX 206 may include a local BSC 218. The local BSC 218 may be resident in the softswitch 210, the IP-PBX 206, or both. By way of example and not limitation, the local BSC 218 may be implemented as a module in the embedded softswitch 210 or as a card or other removable or non-removable memory in the IP-PBX 206.

The pico-cell extension 200 also includes a router 218 for connection of the pico-cell extension 200 to the cellular network 104 via the Internet 114 and/or a protocol gateway 220 for connection of the pico-cell extension 200 to the cellular network 104 via the PSTN 116. The media gateway 220 may include media gateway control protocol (MGCP), primary rate interface (PRI), session initiated protocol (SIP), combinations thereof, and the like. Alternatively, one or both of the router 218 and gateway 220 could be integrated with one of the other components of the pico-cell extension 200 (e.g., the BSC 204, IP-PBX 206, pico-cell 202, or the like).

While the various components of the pico-cell extension are shown as being implemented on the enterprise premises, in some implementations, portions of the pico-cell extension could be located offsite, for example, at locations of the cellular carrier. In addition, while the various components of the pico-cell extension are shown as being separate components, these components could be rearranged and/or combined as desired.

In some instances, particularly for smaller enterprises, the enterprise may not have the resources or the desire to administer and update a HLR and/or enterprise customer database. Nevertheless, such enterprises may still want to be able to use their cell phones or other mobile devices within their facilities or other areas of poor cellular coverage. In that case, the enterprise could benefit from the installation of a pico-cell extension requiring minimal administration by the enterprise itself.

Figure 3:
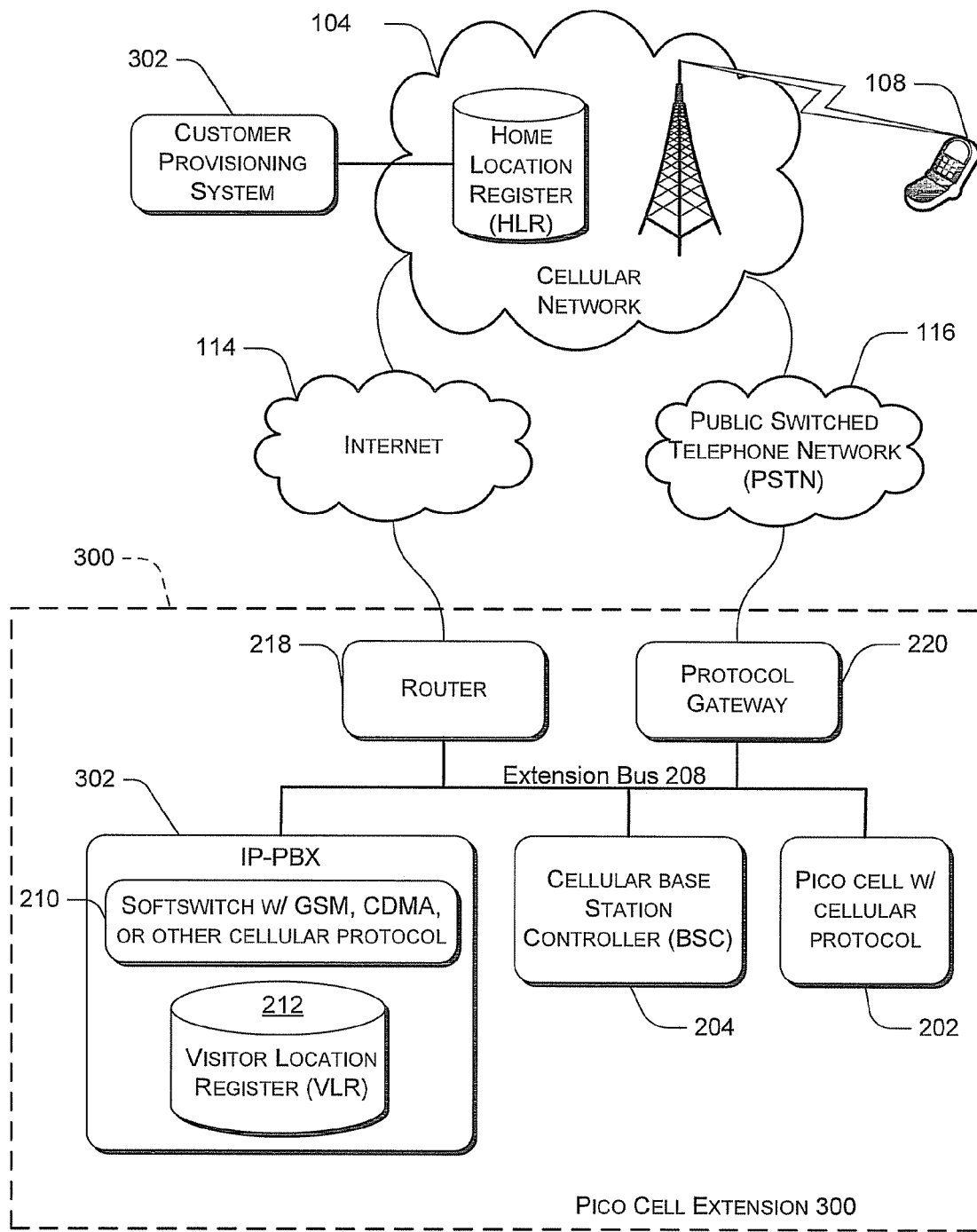
FIG. 3 is a block diagram showing details of another exemplary implementation of a pico-cell extension for a wireless network.

FIG. 3 shows another exemplary implementation of a pico-cell extension 300 for a cellular network, in which administration of user and/or mobile device profiles, feature rule sets, and the like is administered by a cellular carrier or other entity external to the enterprise. The pico-cell extension 300 of this implementation is a simplified version of the pico-cell extension 200 of FIG. 2. In this implementation, the pico-cell extension 300 is similar to that shown in FIG. 2, except for the configuration of the IP-PBX 302. The IP-PBX 302 in this implementation still includes an embedded softswitch 210 with cellular protocols corresponding to those of the connected pico-cells, and a VLR 212 that maintains a list of all mobile devices 108 currently in the coverage area of the IP-PBX 302. However, the IP-PBX 302 of this implementation does not include a HLR or an enterprise customer database. Instead, functionality of those components is implemented at least partially by a customer provisioning system 304 associated with the cellular carrier or other entity external to the enterprise. The customer provisioning system 304 may perform functions similar to the enterprise customer database described with respect to the implementation of FIG. 2. For example, the customer provisioning system 304 may define a list of customers (e.g., employees, clients, etc.) or mobile devices that are authorized to access the enterprise pico-cell extension 300, the features available to end users of the pico-cell extension 300, and/or rule sets about what information, if any, end users can change about their profiles (e.g., PBX features, cellular features, etc.). The customer provisioning system 304 may be updated by the cellular carrier at the direction of the enterprise and/or the end users. Alternatively, the end mobile users may be allowed to update at least some of the information on the customer provisioning system directly through, for example, a web interface, an interface on their mobile devices, or the like. Information input to the customer provisioning system 304 subsequently populates the HLR of the cellular network to update the HLR.

In order to benefit from a pico-cell extension 300 according to this implementation, all the enterprise needs to do is purchase and install the pico-cell 202, IP-PBX 302, and any other components of the pico-cell extension 300 that they do not already have installed. The pico-cell extension 300 then functions as a part of the larger cellular network, with the cellular carrier controlling who is allowed to access the pico-cell extension 300 in much the same way as they would any other conventional cell site at the direction of the enterprise. Thus, the enterprise can benefit from advantages of a pico-cell extension (e.g., reception within the enterprise facility, reduced costs for phones or mobile devices, reduced wireless service charges, and the like) without being required to administer and update a HLR or enterprise customer database.

Figure 4:
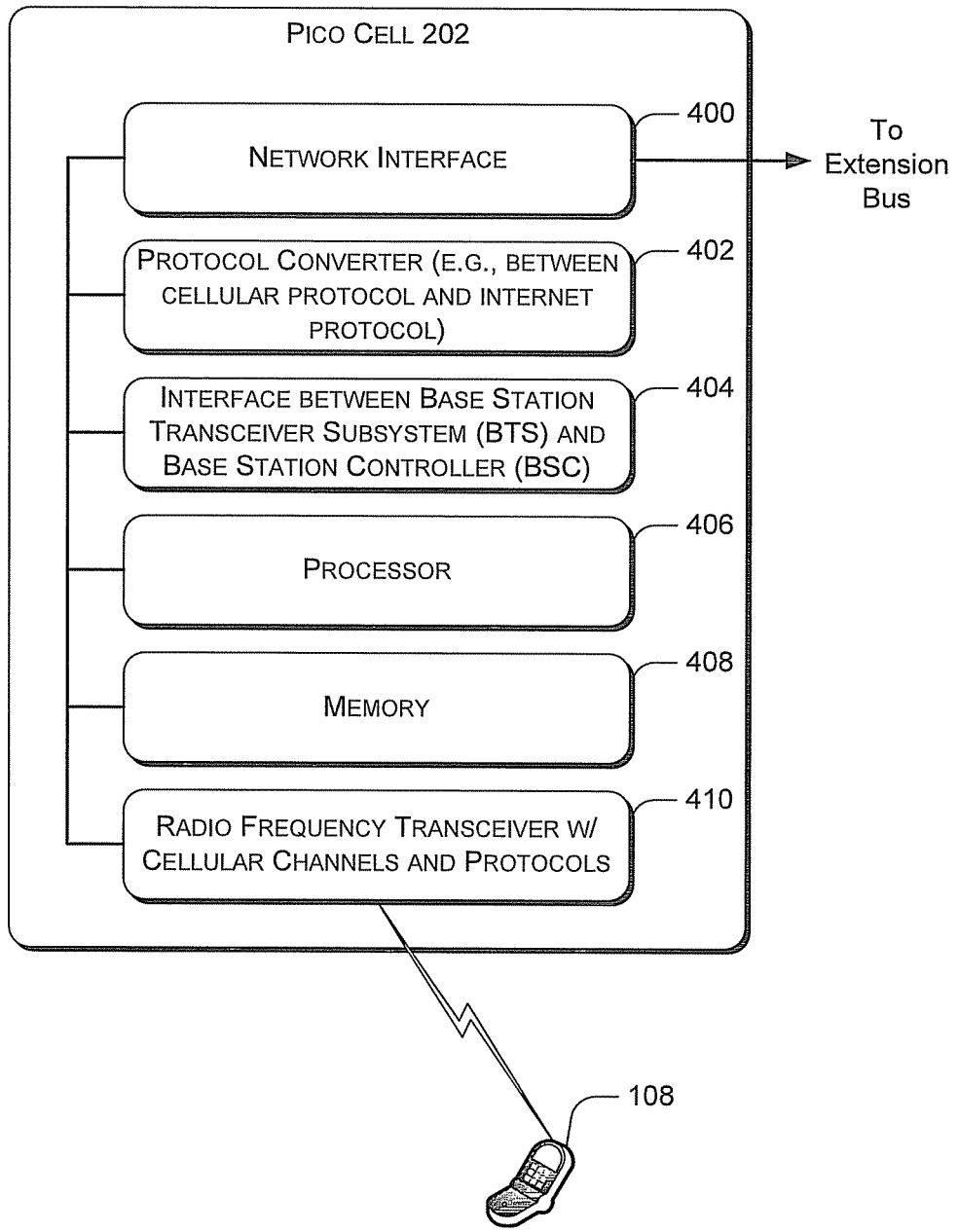
FIG. 4 is a block diagram showing the pico-cell of FIGS. 2 and 3 in more detail.

FIG. 4 shows the pico-cell 202 of FIGS. 2 and 3 in more detail. As shown, the pico-cell 202 includes a network interface 400 for interfacing the pico-cell 202 with the extension bus 208, and a protocol converter 402 for converting between cellular protocol and Internet protocol for transmission over the extension bus 208. The network interface 400 and protocol converter 402 work together to convert protocols associated with mobile devices 108 (e.g., GSM, CDMA, and the like) into protocols suitable for transmission over the extension bus 208.

The pico-cell 202 also includes an interface 404 between the BSC 204 and base station transceiver subsystems (BTSs) associated with the pico-cell extension 200. The BSC-BTS interface 404 receives commands from the BSC 204 and converts them into signals understandable by the BTSs. Each BTS generally is comprised of one or more pico-cells. Thus, the pico-cell extension 200 could include one or more BTSs, each comprising one or more pico-cells. As one example, the pico-cell extension 200 might include two BTSs, each BTS corresponding to a building in the enterprise facility. One BTS might include a single pico-cell (e.g., if the BTS corresponds to a small single-room building), while the other BTS might include twenty or more pico-cells (e.g., if the BTS corresponds to an office building). The network interface 400, protocol converter 402, and BSC-BTS interface 404 all may be implemented as software or a combination of software and hardware. In the example shown, logic or processor 406 executes the functions of the network interface 400, protocol converter 402, and BSC-BTS interface 404 based on interface and conversions stored in memory 408.

The pico-cell 202 also includes a radio frequency (RF) transceiver 410 for wirelessly transmitting and receiving signals to and from the mobile devices 108 in the coverage area of the pico-cell 202. The RF transceiver is configured to transmit and receive on applicable cellular channels using cellular protocols, such as GSM, CDMA, and the like. The applicable cellular channels may vary from country-to-county, but in the United States may include, for example, the 850 megahertz and 1900 megahertz bands. The RF transceiver 410 may include its own onboard memory and/or processor or may use the processor 406 and memory 408 of the pico-cell 202.

Second Exemplary Pico-Cell Extension

Figure 5:
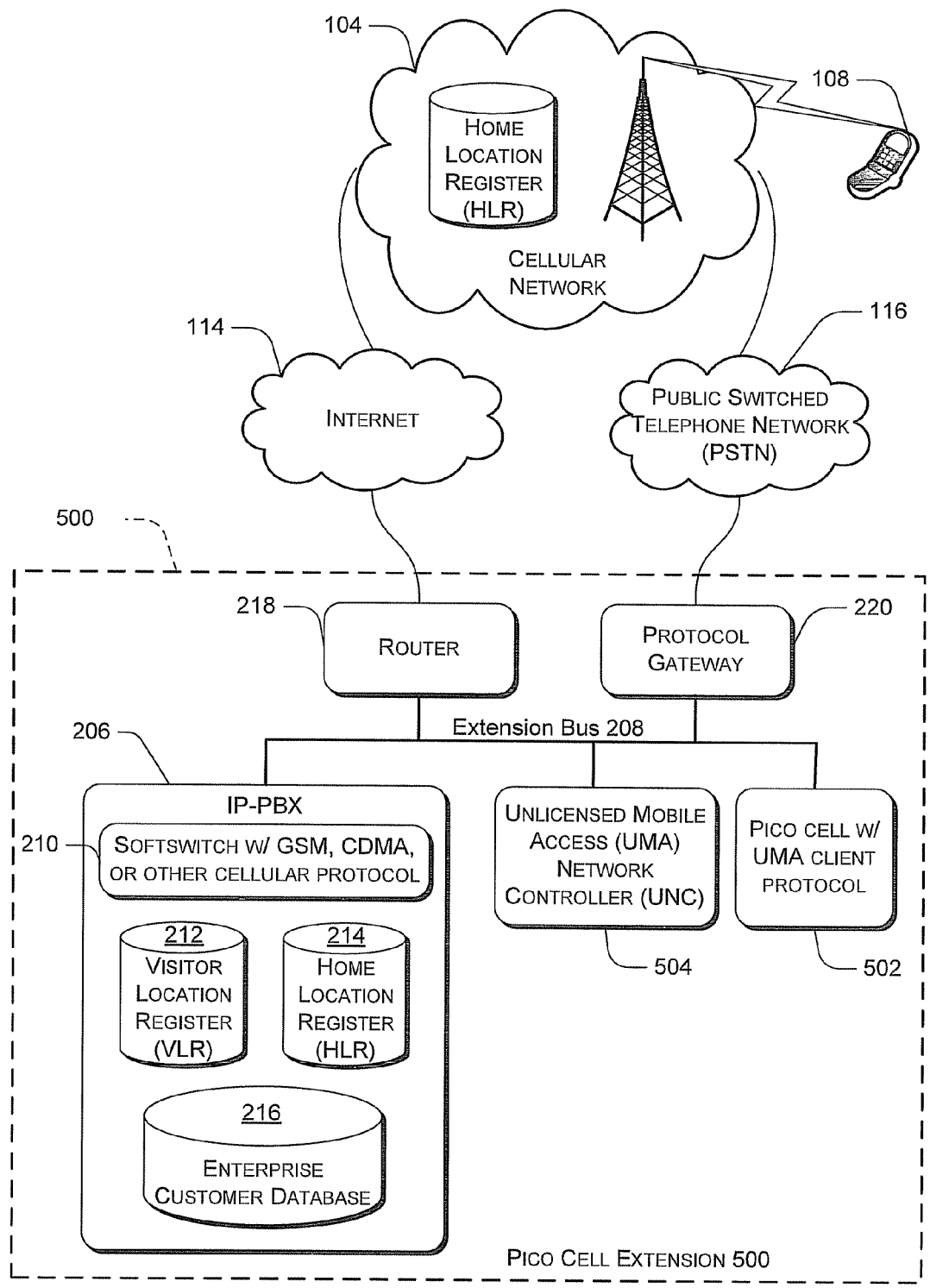
FIG. 5 is a block diagram showing details of another exemplary implementation of a pico-cell extension for a wireless network.

FIG. 5 is a block diagram showing details of another exemplary implementation of a pico-cell extension 500. The pico-cell extension shown in FIG. 5 is similar in most respects to that shown in FIG. 2. Accordingly, for the sake of brevity, only those aspects of the pico-cell extension 500 which are different are described below for this implementation.

In the implementation of FIG. 5, the pico cell extension 500 again includes an IP-PBX 206, an enterprise customer database 214, an HLR 216, a router 218, and a protocol gateway 220 coupled together by a local area network (LAN) or extension bus 208. However, in this implementation, the pico-cell extension 500 includes one or more pico-cells 502 using the unlicensed mobile access (UMA) protocol. The pico-cell extension 500 also includes a UMA network controller (UNC) 504, which is a server connected to the extension bus 208 that acts as a pico-cell aggregator for all the pico-cells 502 within the enterprise. The UNC 502 aggregates the traffic from the pico-cells 502 and communicates with the cellular network 104 to facilitate handover of calls from the pico-cells within the enterprise to cell cites of the cellular network 104 and vice versa.

Figure 6:
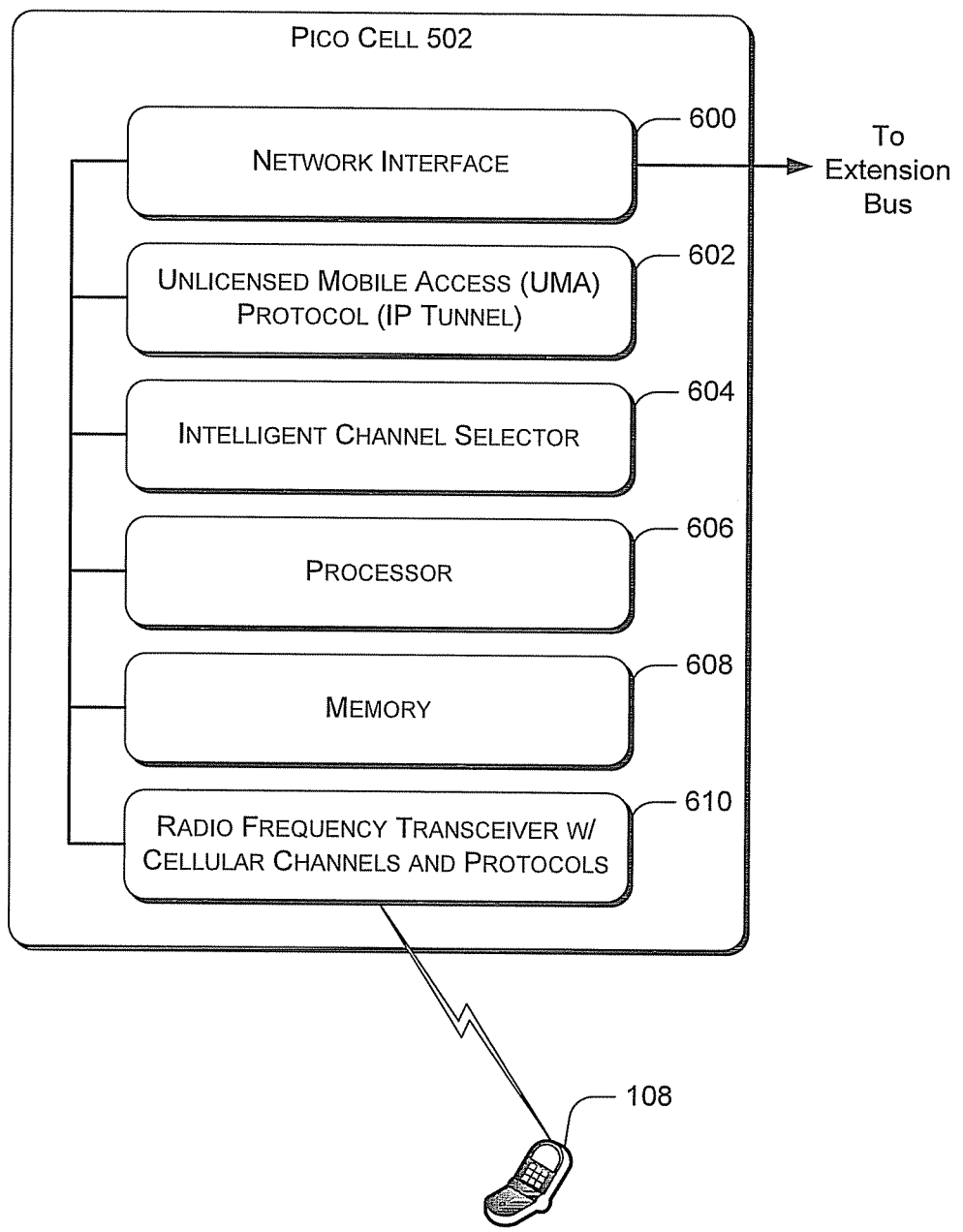
FIG. 6 is a block diagram showing the pico-cell of FIG. 4 in more detail.

FIG. 6 shows the pico-cell 502 of FIG. 5 in more detail. As in the implementation of FIG. 4, the pico-cell 502 includes a network interface 600 for interfacing the pico-cell 502 with the extension bus 208. In this implementation, however, instead of a protocol converter and BSC-BTS interface, the pico-cell 502 includes a UMA protocol IPSEC tunnel 602, which provides a secure connection to the UNC 504 and other components on the extension bus 208. The network interface 600 and UMA protocol IPSEC tunnel 602 interface the pico-cell 502 with the extension bus 208. The pico-cell 502 also includes an intelligent channel selector 604, which determines which cellular frequency in the cellular frequency band for the pico-cell 502 to use to downlink signals to mobile devices. The intelligent channel selector 604 may determine what radio frequency (RF) channel to use from among the channels licensed by cellular carrier, depending on the frequencies used by other nearby cell sites, to minimize interference. In this manner, the intelligent channel-selector 604 can continuously or periodically monitor the cannels that nearby cell cites are using, query a server on the cellular network to determine what other frequencies are available in the licensed frequency band that are not being used by any of the nearby cell cites, and then select one of the available frequencies to use for the pico-cell 502.

The network interface 600, UMA protocol IPSEC tunnel 602, and intelligent channel selector 604 all may be implemented as software, hardware, or a combination of software and hardware. In the example shown, processor 606 executes the functions of the network interface 600, UMA protocol IPSEC tunnel 602, and intelligent channel selector 604 based on interfaces and conversions stored in memory 608.

The pico-cell 502 also includes a radio frequency (RF) transceiver 610 for wirelessly transmitting and receiving signals to and from the mobile devices 108 in the coverage area of the pico-cell 502. The RF transceiver is configured to transmit and receive on applicable cellular channels using cellular protocols, such as GSM, CDMA, and the like. As discussed above, the applicable cellular channels may vary from country-to-county, but in the United States may include, for example, the 850 megahertz and 1900 megahertz bands.

The RF transceiver 510 may include its own onboard memory and/or processor or may use the processor 506 and memory 508 of the pico-cell 502.

Third Exemplary Pico-Cell Extension

Figure 7:
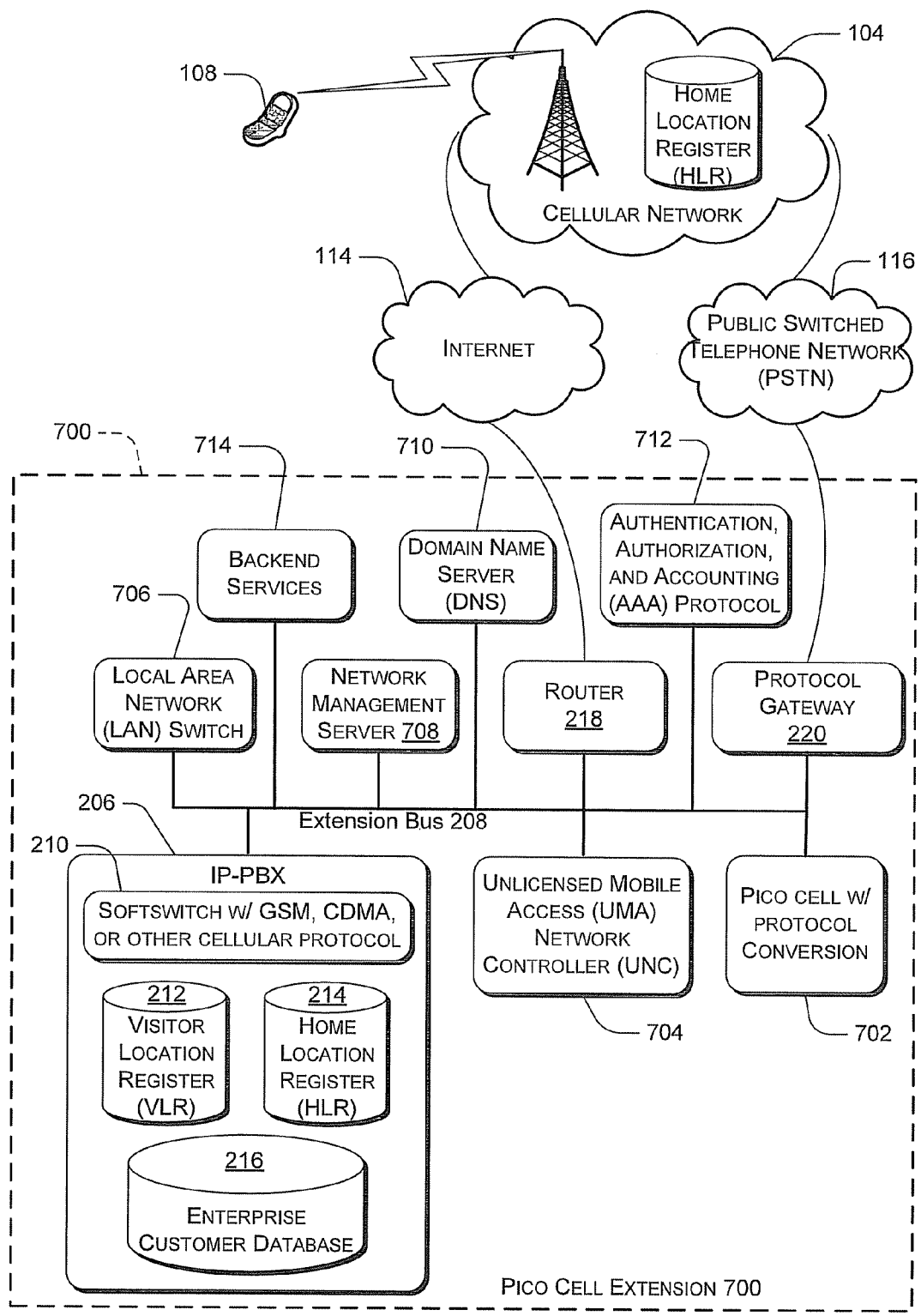
FIG. 7 is a block diagram showing details of yet another exemplary implementation of a pico-cell extension for a wireless network.

FIG. 7 is a block diagram showing details of another exemplary implementation of a pico-cell extension 700. The pico-cell extension 700 shown in FIG. 7 is similar in most respects to that shown in FIG. 2. Accordingly, for the sake of brevity, only those aspects of the pico-cell extension 700 which are different are described below for this implementation.

In the implementation of FIG. 7, the pico cell extension 700 again includes an IP-PBX 206, an enterprise customer database 214, an HLR 216, a router 218, and a protocol gateway 220 coupled together by a LAN or extension bus 208. However, in this implementation, the pico-cell extension 700 includes one or more pico-cells 702 with suitable protocol conversion, such as GSM, CDMA, UMA or the like. The pico-cell extension 700 also includes a UNC 704, which is a server connected to the extension bus 208 that acts as a pico-cell aggregator for all the pico-cells 702 within the enterprise. The UNC 702 aggregates the traffic from the pico-cells 702 and communicates with the cellular network 104 to facilitate handover of calls from the pico-cells within the enterprise to cell cites of the cellular network 104 and vice versa.

In addition, the implementation of FIG. 7 also includes additional network devices connected to the extension bus 208, including a LAN switch 706, a network management server 708, a domain name server (DNS) 710, AAA (authentication, authorization, and accounting) protocol 712, and various other backend services 714, such as, for example, the ability to allow end user to change his or her wireless profile, business-level policies for service-level agreements, customer relationship management services, transport services (e.g., transmission via the Internet), web policy services, distributed data bases and data storage, identification management services (e.g., meta directories and the like), calendar and administration policies. In some implementations, the softswitch 210 could be embedded in the LAN switch 706, rather than the IP-PBX 206, and may include any cellular protocol, such as GSM, CDMA, and the like.

The network management server 708 provides overall management of multiple devices in the customer's network (e.g., workstations, routers, and other network devices). The network management server 708 can schedule communications among devices based on priority of the communications, provide graphical reports (proactively or reactively) in real-time, analysis, polling and/or monitoring of the managed devices, and can send alerts or notifications when problems are detected, or thresholds exceeded. Other network management capabilities may include performance, configuration, accounting, fault, security, and device management.

The DNS 710 stores information associated with domain names and translates the domain names of devices on the LAN or extension bus 208 into corresponding IP addresses. The DNS 710 may also list exchange servers accepting email for each domain.

The AAA protocol 712 authenticates mobile devices 108 that request service on the pico-cell extension 700 by determining whether the mobile device requesting service is a valid user. Authentication may be accomplished, for example, by comparing an identifier of the mobile device (e.g., a phone number, international mobile subscriber identification (IMSI), or the like) to a list of such identifiers in the enterprise customer database 214. Once a mobile device is authenticated to the system, the AAA protocol 712 then authorizes the mobile device to use some or all of the services of the pico-cell extension 700 based on the end user's subscriber agreement with the cellular provider and/or the user's registration with the enterprise. Once the mobile device is authorized, the AAA protocol 712 accounts for (i.e., tracks) the network resources used by the mobile device 108 for management, planning, billing, or other purposes.

As discussed above, it should be understood that the elements discussed above with regard to the pico-cell extensions may be implemented by software, hardware or a combination thereof. If implemented by software, the software may reside on memory associated with any component of the pico-cell extension, standalone memory provided in communication with the LAN or extension bus, a remote memory storage device, removable/nonremovable memory, a combination of the foregoing, or any other combination of one or more computer-readable media. Any number of programs, program modules, data objects, or other data structures may be stored in memory including an operating system, one or more application programs, other program modules, and program data.

In some implementations, pico-cell extensions may also be configured such that a user may enter commands and information via input devices such as a keyboard, pointing device, serial port, and/or the like. These and other input devices may be connected to the one or more components of the pico-cell extension.

Security functions, such as determining user privilege to enter a cellular carrier's network, or defensive mechanisms against the passing of viruses, may also exist in one or more components of the pico-cell extension, such as the pico-cells, the PBXs, the UNC, the BSC, or another component of the pico-cell extension.

While several exemplary implementations have been described having a pico-cell extension with various different features and components, it should be understood that features and components of the various implementations could be rearranged, omitted, modified, and combined with one another and/or additional features and components. Moreover, while the pico-cell extension is described as being within an enterprise facility, pico-cell extensions may be distributed and at least some of the components may reside remotely from the enterprise facilities. For example, one or more components of the pico-cell extension may be provided by and/or reside with a cellular provider or other telecommunications company.

Exemplary Method of Operation

Figure 8:
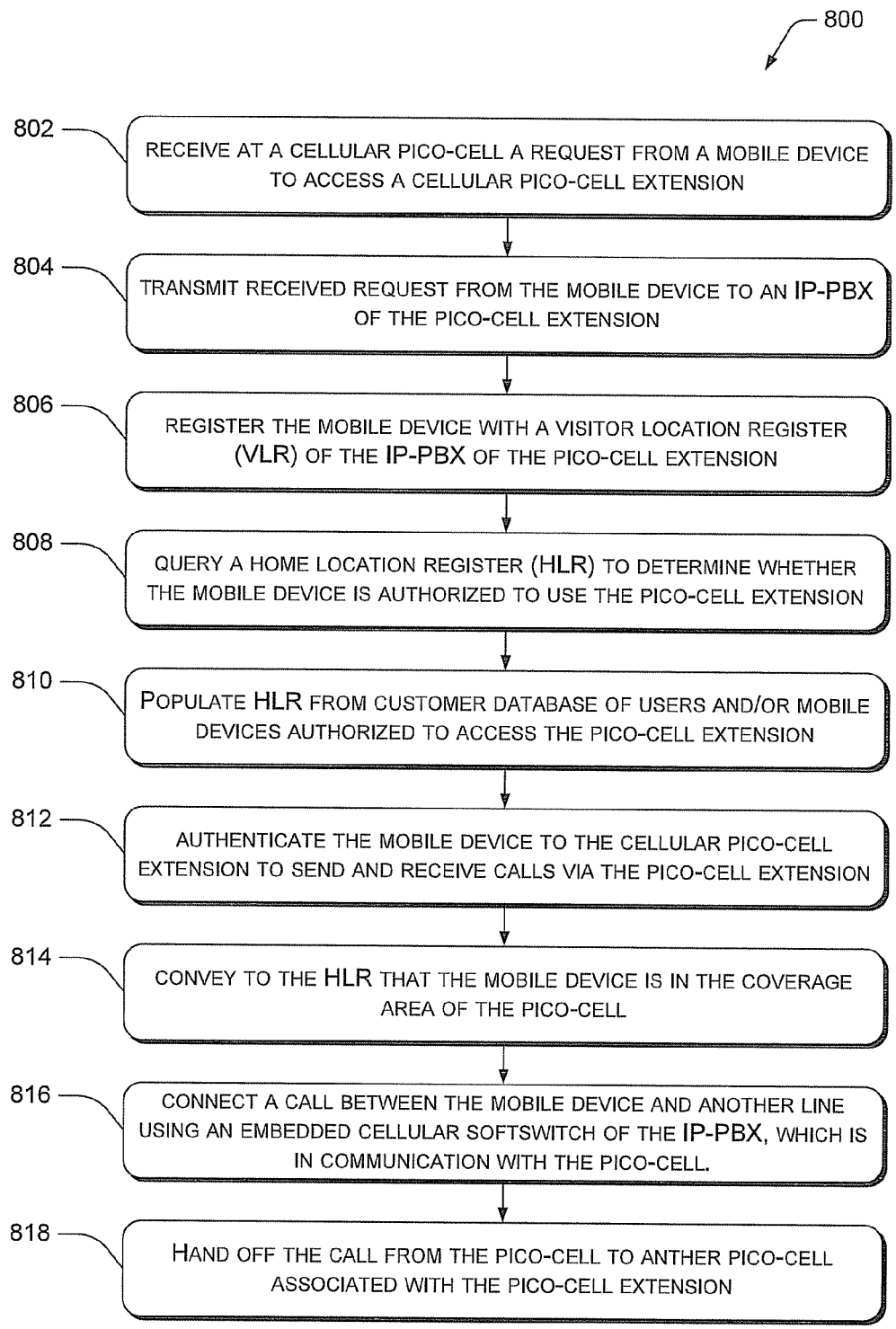
FIG. 8 is a flow chart showing an exemplary method of providing wireless coverage within a facility.

FIG. 8 is a flow chart showing an exemplary method 800 of providing cellular coverage within a facility. The method 800 may, but need not necessarily, be implemented using a system such as those described herein. In one implementation, the method 800 is implemented on a system having a pico-cell extension including one or more pico-cells coupled to an IP-PBX.

The method includes at 802 receiving at a cellular pico-cell a request from a mobile device using a cellular protocol to access a cellular pico-cell extension. Then, at 804, the pico-cell transmits the received request from the mobile device to an IP-PBX of the pico-cell extension. At 806, the pico-cell extension registers the mobile device with a VLR of the IP-PBX of the pico-cell extension. The pico-cell extension also queries a HLR of a remote cellular carrier at 808, to determine whether the mobile device is authorized to use a remote cellular network. At 810, the pico-cell extension populates the HLR from a customer database including a list of users authorized to access the pico-cell extension. In practice, the HLR will have been populated prior to being queried at 808, and may be repopulated continuously as information in the customer database changes, periodically at set intervals, and/or in response to manual instruction to repopulate the HLR.

If the mobile device is not authorized to access the pico-cell extension, the mobile device is not authenticated and is not allowed to access the pico-cell extension. However, if the mobile device is found based on the customer database to be authorized, at 812, the pico-cell extension authenticates the mobile device to the cellular pico-cell extension enabling the mobile device to send and receive calls via the pico-cell extension. The method may also include, at 814, conveying to the HLR of the cellular carrier that the mobile device is in the coverage area of the pico-cell.

Once the mobile device has been authorized to the pico-cell extension, it will be allowed to transmit and receive calls using the pico-cells of the pico-cell extension. Thus, at 816, the pico-cell extension connects a call between the mobile device and another line using an embedded cellular softswitch of the IP-PBX, which is in communication with the pico-cell. If the mobile device moves outside the coverage area of the pico-cell, then at 816, the pico-cell extension hands over the call from the pico-cell to anther pico-cell associated with the pico-cell extension. In this manner, the mobile device functions properly as it is moved around the facility. A similar handover may be performed between a pico-cell of the pico-cell extension and an external cell site of the cellular network.

It should be understood that certain acts in method 800 need not be performed in the order described, may be modified and/or may be omitted entirely, depending on the circumstances and the needs of the enterprise. For example, the pico-cell extension need not necessarily query a customer database as in step 810 and might instead allow any mobile device in the facility to access the pico-cell extension.

Also, any of the acts described above may be implemented by a processor or other computing device based on instructions stored on one or more computer-readable media associated with the pico-cell extension.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
   storing, by a system comprising a processor, device data indicative of a set of user devices authorized to access a wireless picocell extension network that comprises a set of picocell devices;
   in response to receiving, from a communication device, request data indicative of a request to access the wireless picocell extension network and based on the device data, determining, by the system, that the communication device is authorized to access the wireless picocell extension network; and
   in response to the determining, facilitating, by the system, a routing of a call associated with the communication device via an embedded switch device of the wireless picocell extension network, wherein the facilitating comprises facilitating a conversion of first data associated with the call that is transmitted between the communication device and a picocell device of the set of picocell devices via a first communication protocol, to second data that is transmitted between the picocell device and the embedded switch device via a second communication protocol.

2. The method of claim 1, wherein the facilitating comprises facilitating the routing of the call via a network device of a public switched telephone network.

3. The method of claim 1, wherein the facilitating comprises facilitating the routing of the call via a network device of an internet protocol network.

4. The method of claim 1, further comprising:
receiving the device data from a customer data store associated with an internet protocol private branch exchange device of the wireless picocell extension network.

5. The method of claim 1, wherein the receiving comprises receiving the request data via a picocell device of the set of picocell devices.

6. The method of claim 5, wherein the picocell device is a first picocell device and the method further comprises:
in response to determining that the communication device has moved from a first coverage area associated with the first picocell device to a second coverage area associated with a second picocell device of the set of picocell devices, facilitating, by the system, a transfer of the call to the second picocell device.

7. The method of claim 1, further comprising:
prior to the determining and in response to determining that the communication device is within a coverage area associated with the set of picocell devices, storing, by the system, information associated with the communication device within a visitor location data store of the wireless picocell extension network.

8. The method of claim 7, further comprising:
facilitating, by the system, a transmission of data indicative of the communication device being within the coverage area to a home location data store that resides outside the wireless picocell extension network.

9. A system comprising:
a memory to store executable instructions; and
a processor coupled to the memory that facilitates execution of the executable instructions to perform operations, comprising:
receiving, from a communication device, request data indicative of a request to access a wireless picocell extension network that comprises a set of picocell devices;
based on device data indicative of a set of user devices authorized to access the wireless picocell extension network stored within a network data store, verifying that the communication device is authorized to access the wireless picocell extension network; and
in response to the verifying, facilitating establishment of a call associated with the communication device via an embedded switch device within the wireless picocell extension network, wherein the facilitating comprises facilitating a conversion of first data associated with the call that is transferred between the communication device and a picocell device of the set of picocell devices via a first communication protocol, to second data that is transferred between the picocell device and the embedded switch device via a second communication protocol.

10. The system of claim 9, wherein the operations further comprise:
prior to the verifying, facilitating a registration of the communication device comprising storing identifier data associated with the communication device within a visitor location data store coupled to the set of picocell devices.

11. The system of claim 10, wherein the facilitating the registration comprises facilitating the registration of the communication device in response to a determination that the communication device is located within a coverage area associated with the set of picocell devices.

12. The system of claim 9, wherein the operations further comprise:
receiving input data that is utilized to facilitate management of the device data indicative of the set of user devices.

13. The system of claim 9, wherein the operations further comprise:
in response to a determination that the communication device has moved from a first coverage area associated with a first picocell device of the set of picocell devices to a second coverage area associated with a second picocell device of the set of picocell devices, facilitating a transfer of the call from the first picocell to the second picocell device.

14. The system of claim 9, wherein the set of picocell devices is coupled to a set of network devices of a cellular telecommunication network.

15. The system of claim 14, wherein the operations further comprise:
in response to a determination that the communication device has moved outside a first coverage area associated with the set of picocell devices, facilitating a transfer of the call to an access point associated with the cellular telecommunication network, wherein the communication device is within a second coverage area associated with the access point.

16. The system of claim 9, wherein the set of picocell devices are deployed within a specified area associated with an enterprise.

17. A computer readable storage device comprising executable executable instructions that, in response to execution, cause a system comprising a processor to perform operations, comprising:
storing device data indicative of a set of user devices authorized to access a wireless picocell device;
based on the device data, determining that a communication device within a coverage area of the wireless picocell device is authorized to access the wireless picocell device; and
in response to the determining, facilitating an establishment of a communication session associated with the communication device via an embedded switch device coupled to the wireless picocell device; and
converting first data associated with the communication session that is received by the wireless picocell device via a first communication protocol associated with the communication device, to second data that is transmitted from the wireless picocell device to the embedded switch device via a second communication protocol.

18. The computer readable storage device of claim 17, wherein the facilitating comprises directing data associated with the communication session to a public switched telephone network device via a protocol gateway device.

19. The computer readable storage device of claim 17, wherein the facilitating comprises directing data associated with the communication session to a cellular network device via a router device.

20. The computer readable storage device of claim 17, wherein the operations further comprise:

directing, to a home location data store of a cellular network coupled to a wireless picocell extension network device, information that is indicative of the communication device being within a coverage area of the wireless picocell device.

* * * * *